United States Patent
Heimbrodt et al.

(10) Patent No.: US 6,289,947 B1
(45) Date of Patent: Sep. 18, 2001

(54) FUEL TANK SYSTEM ESPECIALLY FOR MOTOR VEHICLES AND METHOD FOR CONTROLLING AND MONITORING SAID SYSTEM

(75) Inventors: Klaus J. Heimbrodt, Löchgau; Helmut Auernhammer, Höttingen; Thomas Theuer; Thomas Conrad, both of Treuchtlingen; Ewald Duermeier, Moeglingen; Bertold Ediger, Backnang; Lothar Mauz, Esslingen; Dieter Scheurenbrand, Wolfschlugen; Manfred Stotz, Aichwald; Manfred Weil, Schorndorf, all of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/486,753
(22) PCT Filed: Sep. 2, 1998
(86) PCT No.: PCT/EP98/05555
§ 371 Date: Jul. 18, 2000
§ 102(e) Date: Jul. 18, 2000
(87) PCT Pub. No.: WO99/11482
PCT Pub. Date: Mar. 11, 1999

(30) Foreign Application Priority Data
Sep. 2, 1997 (DE) .............................. 197 38 198

(51) Int. Cl.[7] ........................................................... B65B 1/04
(52) U.S. Cl. .......................... 141/128; 141/301; 141/286; 220/86.2
(58) Field of Search ..................... 141/128, 301, 141/302, 286, 94, 59; 123/519; 220/86.2

(56) References Cited

U.S. PATENT DOCUMENTS

| Re. 35,054 | 10/1995 | Chikamatsu et al. . | |
|---|---|---|---|
| 4,598,741 | * 7/1986 | Johnson et al. | 141/5 |
| 5,197,442 | 3/1993 | Blumenstock et al. . | |
| 5,590,697 | * 1/1997 | Benjey et al. | 141/59 |
| 5,819,796 | * 10/1998 | Kunimitsu et al. | 141/59 |
| 6,095,207 | * 7/2000 | Enders | 141/348 |

FOREIGN PATENT DOCUMENTS 0 000 188    1/1979   (EP) .

* cited by examiner

Primary Examiner—Steven O. Douglas
(74) Attorney, Agent, or Firm—Venable

(57) ABSTRACT

The invention relates to a method for filling a fuel tank (2) with a filling conduit (4). The fuel flow entering the tank is directed by a through flow sensor (53) in order to control and monitor the filling process. A particularly suitable tank system (1) for implementation of said method comprises a fuel tank (2), a filling tube (3) surrounding a filling conduit (4) and discharging into said fuel tank, an adsorption filler (6) connected to the gas area (8) of the tank (2) and a through-flow sensor (53) which detects the flow of fuel in the filling tube (2).

24 Claims, 4 Drawing Sheets

Figure 1:
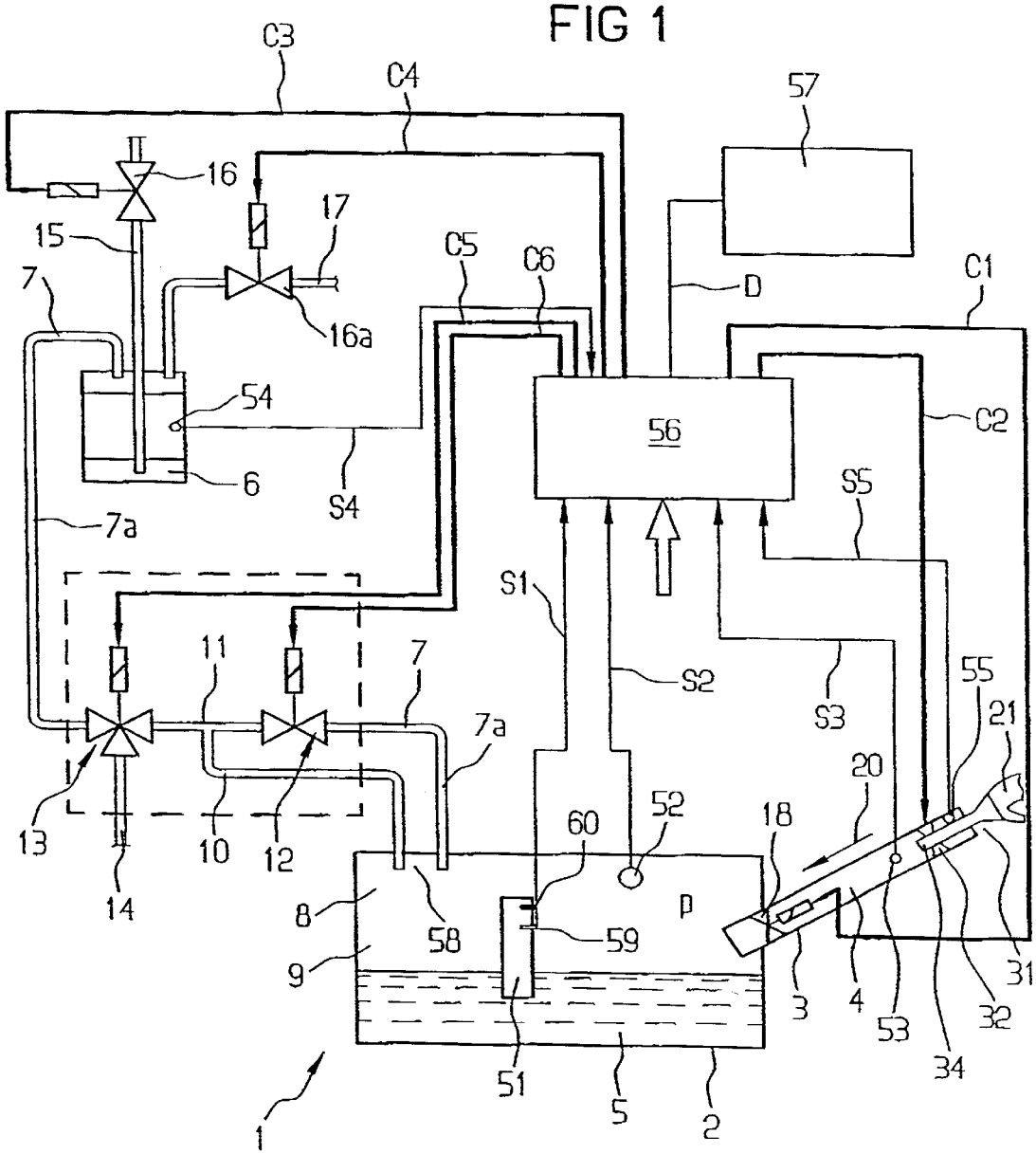

FUEL TANK SYSTEM ESPECIALLY FOR MOTOR VEHICLES AND METHOD FOR CONTROLLING AND MONITORING SAID SYSTEM

The invention relates to a fuel tank system, particularly for motor vehicles, and a method of controlling and monitoring the system. Tank system refers to a mobile or stationary tank, particularly a fuel tank for a vehicle, that can be filled and emptied.

In such tank systems for fuel or other volatile liquids, emissions of fuel or liquid vapors should usually be avoided. In tank systems for motor vehicles, emissions that arise during operation and during fueling are avoided through the connection of the gas area that is present above the liquid level in the container, and forms a variable equalizing volume as a function of the fullness level, to an adsorption filter, such as an active-charcoal filter via at least one vent conduit. Currently, tank systems that employ various sensors to monitor the fueling process are being used in increasing numbers. For example, U.S. Pat. No. 5,197,442 describes a tank system for a motor vehicle, in which a sensor determines the internal pressure of the tank, and the opening state of the vent line is controlled as a function of the internal tank pressure. It is also known to detect further parameters for controlling and monitoring the fueling process. For example, US Re35,054 describes a tank system for a motor vehicle, in which the fuel temperature and fullness level are detected in addition to the internal tank pressure. While the monitoring devices of the known container systems prevent excessive fuel vapors or fuel via the vent lines, they do not, however, satisfactorily take into consideration fueling via the filling tube or conduit itself, and the associated problems, such as the overflow of fuel via the fuel conduit due to excessive internal tank pressure, or overfilling.

It is the object of the invention to provide a tank system that is improved in this regard, as well as a method of monitoring and controlling the system.

With respect to the method, this object is accomplished by the features of claim 1. Accordingly, a sensor detects the fuel flow entering the tank, which is used as a parameter for monitoring and controlling the tank system. This sensor can determine, for example, whether a gas nozzle or nozzle hose is shut off at a given fuel level in the fuel tank. Hence, the tank-monitoring system can detect a nozzle malfunction and initiate corresponding actions, for example, protecting the adsorption filter from being flooded with liquid fuel. Furthermore, the proposed sensor can be used to determine whether, for example, the operator is attempting to continue filling the tank with fuel after the nozzle has shut off, for example, to round off the liter number or the price of the fuel.

In a preferred variation of the method, in the presence of a fuel flow in the filling tube, the gas area of the tank is connected to the adsorption filter via an additional vent conduit. Normally, in the tank systems discussed here, operational ventilation is effected by a vent conduit having a smaller flow cross section. When the fuel tank is filled, significantly-larger quantities of gas must be supplied to the adsorption filter. This is assured by the connection of an additional vent conduit having a larger flow cross section. In the system known from U.S. Pat. No. 5,197,442, the additional vent line is enabled when the fuel door is open. The drawback of this system is that the fueling ventilation is also active when the fuel door has been inadvertently left open during normal operation. Furthermore, the criterion of "fuel door open or closed" can scarcely be utilized in further control and monitoring functions, for example those relating to fueling. This is not the case in the proposed method.

For example, in a further preferred variation of the method, when a first fuel level is attained, the flow of fuel into the tank is reduced. Because of a throttling or a brief, possibly repeated, closure of the filling conduit, the fuel rapidly climbs to the nozzle or is swirled up to it. Consequently, the nozzle is shut off. The operator is thus informed that the tank system has been filled to a first fullness level, or a nominal volume, or is basically "full." The filling conduit is only throttled or completely closed for a predetermined time. Afterward, the fuel can flow into the tank when the filling conduit is open. The flow sensor informs the system whether the performed measure has actually led to the shutoff of the nozzle hose; in the event of a shutoff of the nozzle and after the fuel has flowed off from the filling conduit, the sensor generates a corresponding signal. The flow sensor thus provides the monitoring system with continuous acknowledgement of whether a measure aimed at shutting off the nozzle has been successful.

If a gas nozzle has not been shut off, due to a structural stipulation or because of a malfunction, or if the operator is continuing the fueling process to "top off" the tank, the risk exists that fuel will reach the adsorption filter by way of the vent line. To prevent this, in a further variation of the method, all of the connections between the tank and the adsorption filter are broken when a second, maximum fullness level is reached, and the flow opening of the filling conduit is closed. This prevents the adsorption filter from being flooded with fuel. Immediately after the filling conduit has been closed, fuel travels upward, which either shuts off the properly-functioning nozzle hose or, if this is not the case due to a malfunction, fuel flows out of the filling opening of the filling conduit. In the extreme case discussed here, it is advantageous if not only all of the connections to the adsorption filter, that is, including the operational ventilation, are broken, but the ventilation conduit that assures the service ventilation connects with the atmosphere. Additional fuel can then flow off by way of this connection.

A problem occurring in methods or tank systems of the aforementioned type is that, during fueling, the fuel-air mixture—referred to hereinafter as vent gas—can reach the outside by way of the filling conduit. In some systems, an elastic collar that tightly surrounds the nozzle hose of a gas nozzle inserted into the filling conduit prevents this from happening. In other systems, the annular gap between the outer circumference of the nozzle hose and the wall of the filling conduit is kept as small as possible. This seal, referred to as a "liquid seal," operates according to the sucking jet pump principle. When fuel is pumped, a vacuum is created on the tank side of the annular gap, which effects an inward-oriented air current through the annular gap. The drawback of the permanent seal is that it prevents the exit of fuel in the above-described extreme situation. The drawback of the seal operating according to the vacuum or Venturi principle is that it only operates satisfactorily if fuel is pumped at a relatively-high flow rate. In a proposed variation of the method, the aforementioned annular gap between the nozzle hose and the edge of the filling conduit is sealed during the fueling phase, and is re-opened after fueling is completed, or when the first or second fullness level is attained. This assures a hermetic seal during fueling, even if fuel pumping is interrupted in the process, or if fuel is compelled to flow out in the event of overfilling. A suitable sensor is required for the latter situation.

With respect to the fuel tank system, the object is accomplished by the features of claim 10. Accordingly, in a fuel tank having a filling tube and an adsorption filter that is connected to the gas area of the tank, a flow sensor is disposed in the filling tube, which detects the presence or absence of a fuel flow. The flow sensor can be configured to indicate the magnitude of the fuel flow. It can do this by using a baffle plate that projects into the flow cross section of the filling conduit and shifts its inclination more or less, depending on the magnitude of the impacting fuel flow. Preferably, however, a capacitive flow sensor is used, because the magnitude of the fuel flow need not necessarily be determined for performing the discussed control functions. Furthermore, a capacitive sensor operates very reliably and without malfunctions. With a sensor of this type, it suffices for its fuel-detecting[1] to be disposed in the region of the filling tube.

A flow-control valve that is disposed in the region of the tank-side end of the filling tube and is controlled as a function of the fullness level preferably effects the reduction or complete cutoff of the fuel flow into the tank. For this purpose, a fullness-level sensor is present in the tank. The flow-control valve is configured such that the fuel overflowing from the filling tube into the fuel tank can be throttled or cut off. The throttling and cutoff of the fuel flow last for a predetermined time span. Afterward, the filling tube is re-opened.

In a preferred embodiment, the aforementioned annular gap between the nozzle hose of a nozzle and the filling opening is sealed by a sealing diaphragm that surrounds the nozzle hose and has a diaphragm opening that can be altered by means of a motor, that is, with the aid of an adjusting element, such as an electromagnet. The diaphragm opening is set such that, after the fuel cap is opened, the nozzle hose can be inserted unimpeded into the filling conduit. The diaphragm opening is subsequently narrowed with the aid of a motor, particularly an electric motor. The sealing diaphragm is preferably essentially formed by a sleeve that is elastically deformable in at least the radial direction. In one embodiment, the narrowing takes place in that the sleeve is surrounded by a cable loop that can be tightened by a motor. In an alternative embodiment, the elastically-deformable sleeve is essentially positioned in a form-fit in a radial recess of the filling tube, with the length, i.e., the axial extension, of the recess being altered by means of a motor. If the axial extension of the radial recess is shortened, the sleeve is axially compressed, which causes its inside wall to arch in a concave manner into the filling conduit and tightly surround the nozzle hose.

Figure 2:
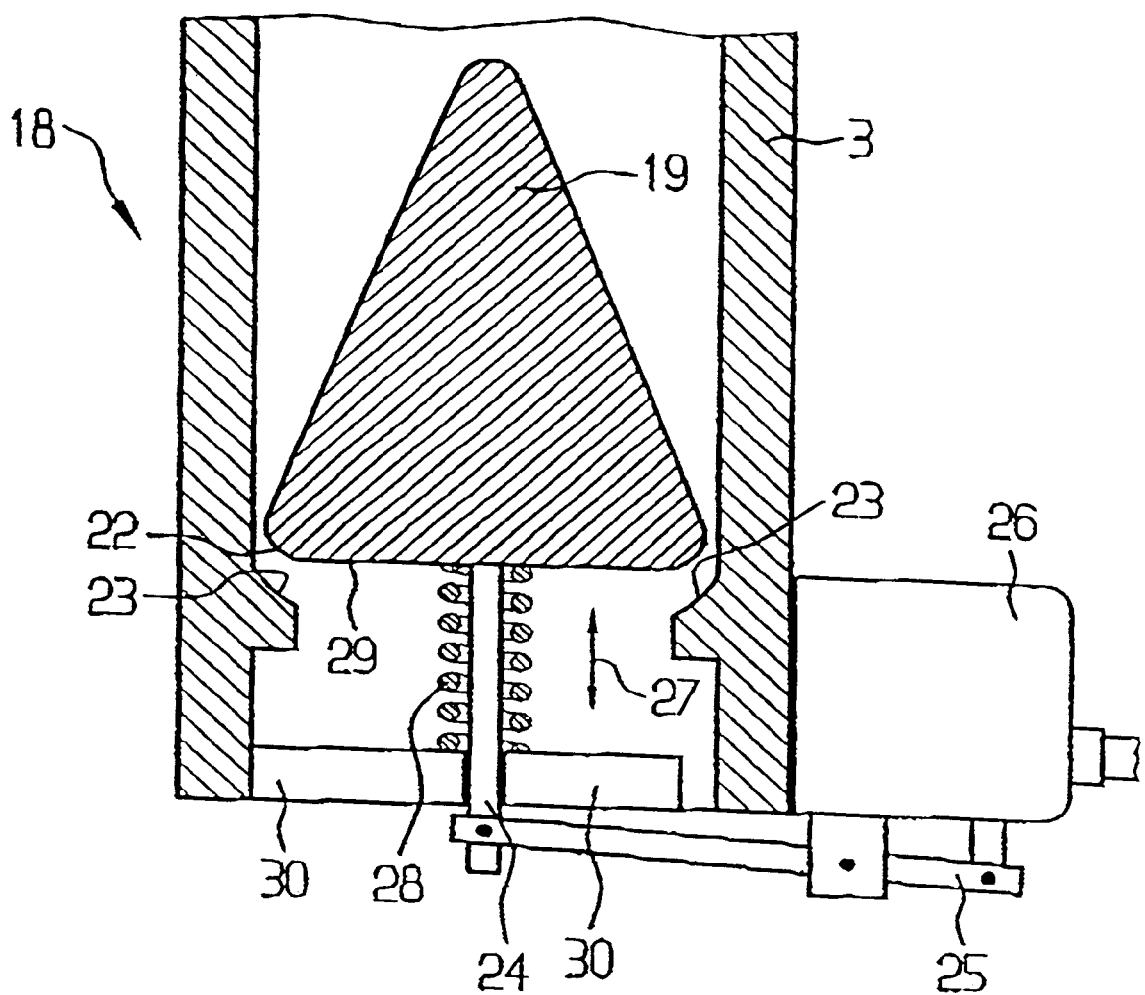
Figure 3:
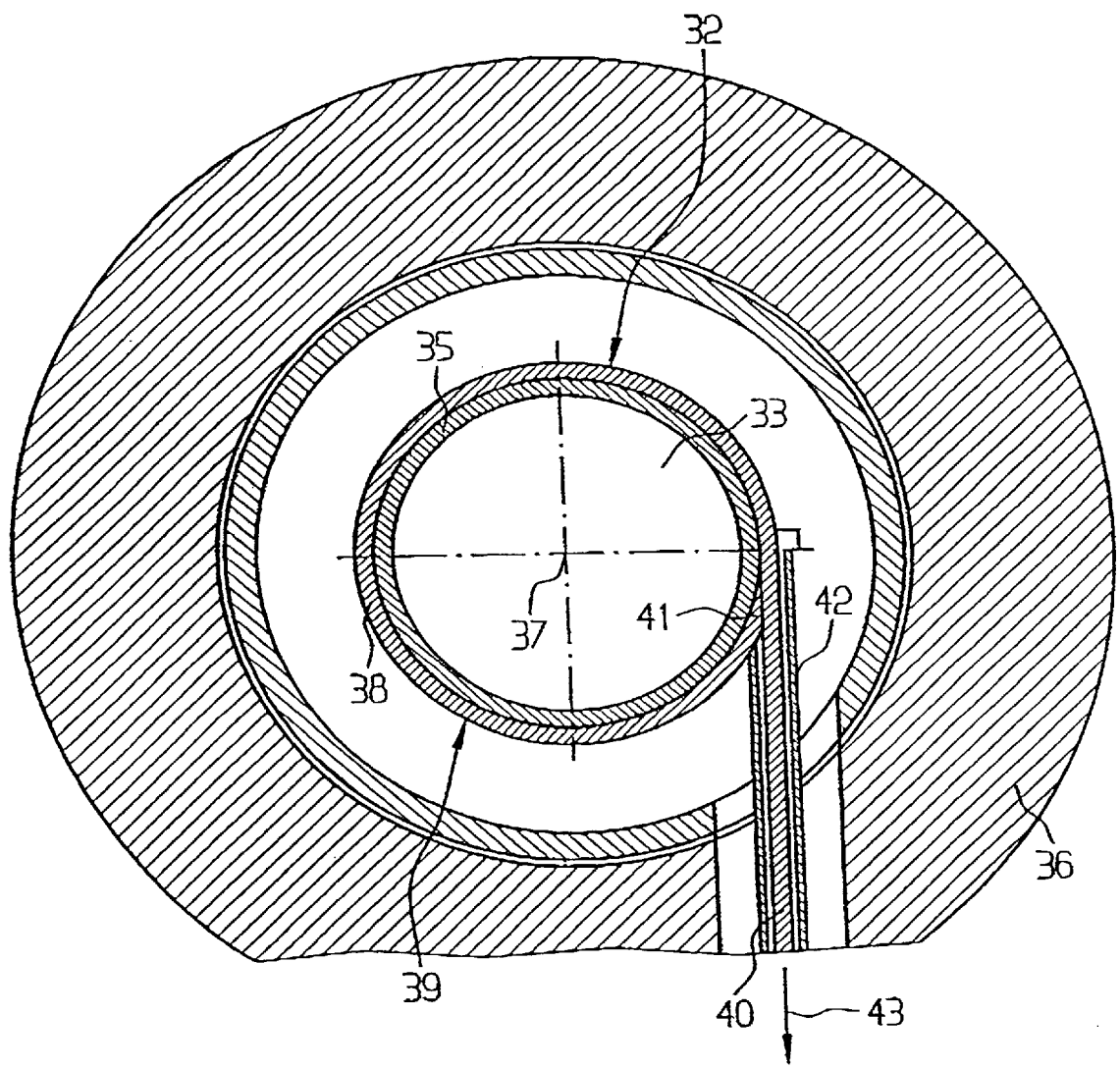
Figure 4:
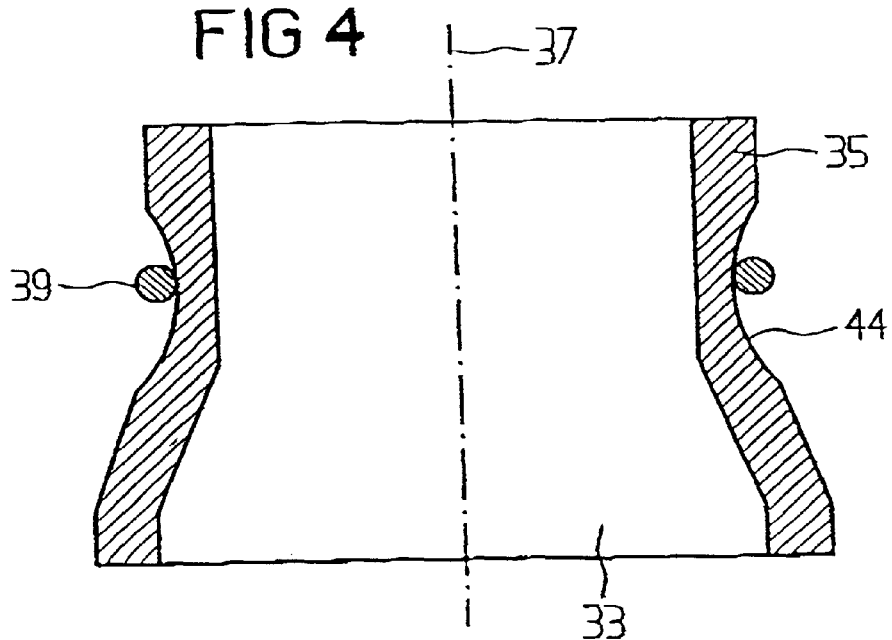
Figure 5:
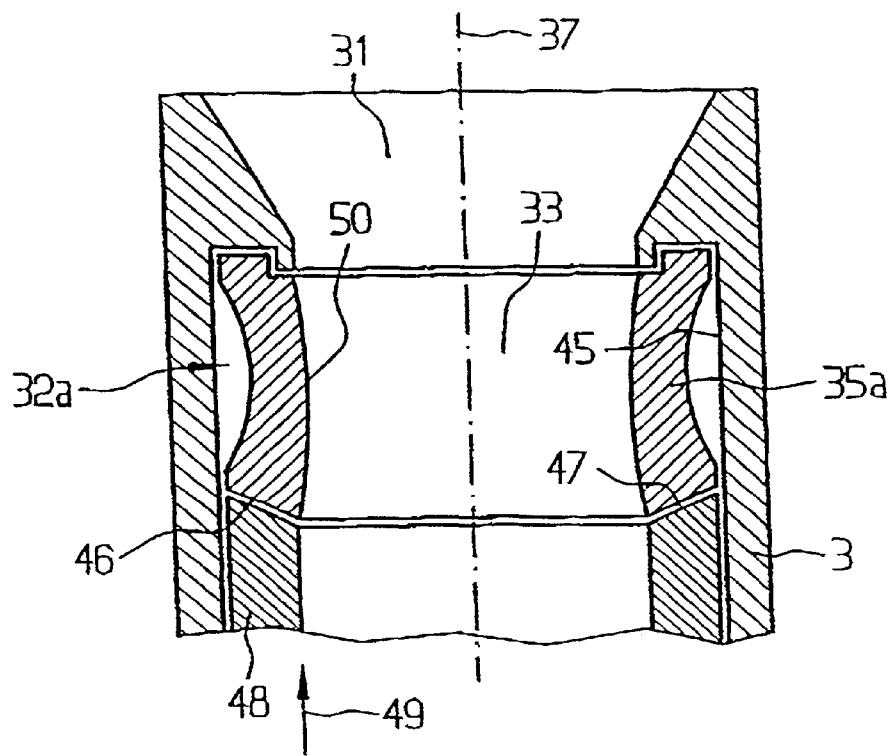

Embodiments of the invention are explained in detail below in conjunction with the attached drawings. Shown are in:

FIG. 1 a fuel tank system provided with components for executing a method for monitoring and controlling the fueling process in particular;

FIG. 2 a schematic, sectional representation of a flow-control valve;

FIG. 3 a plan view, partly in section, of a sealing diaphragm;

FIG. 4 a longitudinal section of an elastic sleeve as an essential component of a sealing diaphragm; and FIG. 5 a sectional representation of the filling end of a filling tube, with an alternative embodiment of the sealing diaphragm.

FIG. 1 is a schematic illustration, by way of example, of the tank system 1 of a motor vehicle. The tank system 1 includes a tank 2 or fuel tank having a filling conduit 4, which is formed by a filling tube 3, for filling the tank 2 with fuel 5. The tank system 1 further includes an adsorption filter 6, which is connected via a first vent line 7 to the gas area 8 located above the liquid level in the tank 2. A fuel-air mixture or vent gas 9 is located in the gas area 8. A second vent line 10 branches off from the gas area 8, and terminates into the first vent line 7. The second vent line 10 has a smaller diameter than the first vent line 7, and serves in operational ventilation. A check valve 12, which is embodied as a 2/2-way valve and is electromagnetically actuated, is switched into the partial segment 7a extending from the termination site 11 to the tank 2. A check valve 13, which is embodied as a 3/2-way valve and is electromagnetically actuated, is switched into the partial segment 7b of the first vent line 7 extending between the termination site 11 and the adsorption filter 6. Two of this valve's connections are associated with the partial segments 7a and 7b of the first vent line 7, and its third connection is associated with a discharge line 14.

The output side of the adsorption filter 6 is connected to the atmosphere via a line 15. An electromagnetically-actuated check valve 16 is switched into the line 15. The input side of the adsorption filter 6 is connected to the intake pipe of a vehicle engine (not shown) via a suction line 17 having an interposed scavenging valve 16a.

A flow-control valve 18, which is electromagnetically actuated, is disposed in the lower end, that is, the end near the tank 2, of the filling tube 3. The flow-control valve can have various configurations. In the embodiment illustrated in FIG. 2, it is a check valve having two switching positions. The closing element 19 of the valve is embodied as a cone, with the cone tip pointing away from the tank 2, or counter to the filling direction 20. This embodiment of the closing element is particularly beneficial for the fuel flow, and thus presents only a slight flow resistance to the fuel flow introduced into the filling tube 3 by a gas nozzle 21. The lower edge 22 of the closing element is rounded, and cooperates with a valve seat 23, which has a complementary design and protrudes radially inward from the inside wall of the filling tube 3. An actuating pin 24, which can be moved back and forth in the direction of the two-headed arrow 27 by the drive lever 25 of an electromagnet 26 or adjusting element, protrudes from the base surface 29 of the conical closing element 19. The actuating pin 24 is surrounded by a compression spring 28, which is supported on one side against the base surface 29 of the closing element 19 and on the other side against support struts 30, which extend radially inward from the inside wall of the filling tube 3. The flow-control valve 18 has two switching positions, namely an open position (FIG. 2) and a closed position; in other words, the edge 22 of the closing element 19 rests against the valve seat 23.

Inside the filling tube 3, a sealing diaphragm 32 that can be narrowed by means of a motor is disposed near the filling opening 31. The diaphragm opening 33 can be reduced until the nozzle hose 34 of a gas nozzle 21 that is inserted into the filling tube 3 is surrounded with a hermetic seal. FIG. 3 illustrates an embodiment of a sealing diaphragm. The essential component of the sealing diaphragm 21 [sic] is a sleeve 35, which comprises a fuel-resistant elastomer and is elastically deformable in at least the radial direction. The sleeve 35 is disposed inside a housing 36 located at the filling end of the filling tube 3, with its central longitudinal axis 37 also essentially forming the central longitudinal axis of the region of the filling tube 3 that surrounds the sleeve 35. A cable 38 is looped around the periphery of the sleeve 35 in the form of a cable loop 39. The one end 40 of the cable loop 39 is guided away tangentially from the sleeve 35, and is connected to a drive (not shown). In the peripheral region of the sleeve 35, the other end 41 of the cable loop 39 is secured to a tube 42, in which the end 40 of the cable loop is guided. When the cable end 40 is moved in the direction of the arrow 43, the diaphragm opening 33 is narrowed. The peripheral region against which the cable loop 39 rests has an annular narrowing 44.

FIG. 5 shows an alternative embodiment of a sealing diaphragm 32a. The elastically-deformable sleeve 35a is positioned essentially in a form-fit in a radial recess 45 of the filling tube 3, or a separate part that forms the filling opening 31. The end face 46 of the sleeve 35a facing away from the filling opening 31 is conical, with the cone surface opening toward the filling opening 31. It cooperates with the— likewise conical—end face 47 of an essentially tubular drive part 48 that moves in the direction of the central longitudinal axis 37. If the drive part is moved in the direction of the arrow 49 by an adjusting element (not shown), the inside wall 50 of the sleeve 35a curves radially inward and surrounds a nozzle hose that has been inserted into the filling opening 31.

In addition to the above-described components, the tank system 1 includes a plurality of sensors, namely a level sensor 51 and a pressure sensor 52, both of which are disposed in the tank 2; a flow sensor 53, which has at least its sensitive part inside the filling tube 3, between the sealing diaphragm 32 and the flow-control valve 18; a load sensor 54, which detects the level of fuel vapors in the adsorption filter 6; and a nozzle sensor 55. The latter is disposed between the sealing diaphragm 32 and the filling opening 31, or at the filling tube, and detects the presence of the nozzle hose 34 of a gas nozzle 21. These sensors are connected to a control module 56 by way of signal lines S1–S5. The control module 56 in turn controls the valves 12, 13, 16, 16a, 18 and the sealing diaphragm 32 by way of control lines C1–C6. A diagnosis module 57, with which the tank system 1 can be checked for leakage, for example, is connected to the control module 56 by way of a data line D, or is integrated into it.

A tank system according to the invention functions as follows:

In the operating mode, during which the filling opening 31 of the filling tube 3 is closed by a fuel cap (not shown), the check valve 12 is closed. The check valve 13 is in a switching position in which the two segments 7a and 7b of the first vent line 7 are connected, and the discharge line 14 is closed. When the fuel is heated, for example, the tank is ventilated by way of the second vent line 10 and the segment 7b of the first vent line 7. Ventilation as discussed previously and hereinafter also encompasses aeration, in which outside air is sucked into the tank 2 via the aforementioned path, for example when the fuel level drops. The pressure sensor 52 monitors the internal tank pressure during operation and during fueling, and conducts a corresponding sensor signal to the control module 56 via the signal line S2. If the internal tank pressure p exceeds a predetermined value, the check valve 12 can additionally be opened to assure a rapid pressure reduction. The pressure monitoring thus renders the tank 2 essentially pressureless in a typical case. In an alternative embodiment of a tank system, a conventional float valve having a rollover function can be disposed inside the container 2, approximately at the location 58, instead of the check valve 13. A valve of this type usually keeps the vent line 10 open. The vent line 10 is only closed if the float of the valve is raised due to sloshing fuel, or if the vehicle assumes an extremely inclined or head-down position.

The load sensor 54 continuously reports the load situation of the adsorption filter 6 to the control module 56 via the control line S4. If the load exceeds a specific threshold value, the scavenging valve 16a is opened via the control line C4, provided that the vehicle engine is in a defined operating mode. Atmospheric air is sucked through the adsorption filter 6 via the suction line 17, the line 15 and the—normally open—check valve 16; the adsorbed fuel is thereby desorbed, and the adsorption filter is scavenged. Active charcoal serves as the filter mass. After scavenging is complete, the scavenging valve 16a is closed again. The check valve 16, in contrast, remains open to assure operating ventilation.

If the tank 2 is to be filled with fuel, first the fuel cap (not shown) is removed from the filling opening 31 of the filling tube 3. Because atmospheric pressure normally dominates in the tank 2, only a negligible amount of vent gas escapes from the filling opening 31 when the fuel cap is open. If an overpressure is intended to be present in the tank due to a malfunction of the operating ventilation, for example, the flow-control valve 18, which essentially reduces the flow cross section of the filling tube 3, even in the open position of the tube, essentially prevents fuel from spilling out of the filling opening 31 due to the sudden pressure relief when the fuel cap is removed.

As soon as a gas nozzle 21 that has been inserted into the filling opening 31 pumps fuel, the flow sensor 53 becomes active and transmits a corresponding signal to the control module 56. This effects two actions. First, the check valve 12 is opened to assure ventilation via the vent-line segment 7a with its large inside diameter. Second, the sealing diaphragm 32 is actuated via the control line C2, causing the sleeve 35 to surround the nozzle hose 34 of the nozzle 21 with a hermetic seal (FIGS. 3–5). This prevents fuel vapors from escaping via the filling tube 3. It is also conceivable that the two actions, namely the opening of the check valve 12 and the closing of the sealing diaphragm 32, are triggered by a different start signal, specifically when the valve sensor 55 detects the presence of a nozzle hose 34.

If the fuel 5 has reached a first fullness level 59 in the tank 2, and the flow sensor 53 reports a fuel flow, the flow-control valve 18 is closed, at least for a specified, short time. Consequently, at least fuel injectors can quickly reach the nozzle 21 and shut it off. After the aforementioned time has passed, the flow-control valve re-opens, so the flow that has accumulated in the filling tube 3 can flow off into the tank 2. The flow-control valve 18 is thus cyclically closed. The flow-control valve 18 can, however, also be configured to throttle the flow cross section of the filling tube, so the quantity of fuel supplied from the nozzle 21 is larger than the quantity flowing into the container 2, causing fuel to rise in the filling tube 3 and reach the nozzle 21.

If the flow sensor 53 no longer indicates fuel, after a specified period of time, the sealing diaphragm 32 is opened and the check valve 12 is closed. Fueling is complete. In a normal scenario, a fuel cap is placed onto the filling opening 31.

If the first fullness level 59 has been reached and the flow sensor 53 continues to indicate a fuel flow, the flow-control valve 18 is again closed cyclically, that is, it is closed briefly and re-opened. Normal fueling, as described above, is therefore no longer possible after the first fullness level 59 has been reached, because the valve 18 continuously prevents the fuel from flowing into the tank 2. Therefore, more fuel is conveyed into the filling tube 3 than can flow into the tank 2. Consequently, the nozzle 21 is shut off after relatively-small quantities of fuel are pumped. The sealing diaphragm 32 remains closed during this "topping-off phase."

When a second, maximum fullness level 60 is attained— due to a number of refueling steps, or because the nozzle 21 has not shut off due to a malfunction—the flow-control valve 18 is closed and, after a specified period of time, the sealing diaphragm 32 is opened. As soon as the second fullness level 60 has been reached, the check valve 12 is closed, so no fuel can reach the adsorption filter 6 by way of the vent line 7a. The vent line 10 has a relatively-small inside diameter, so fuel can hardly flow through this line to the adsorption filter 6. To reliably preclude this scenario, the check valve 13 can also be closed, in which case fuel that may be entering the vent line 10 can flow off into the environment by way of the discharge line 14. It is also conceivable, however, for a floating rollover valve to be integrated into the two vent lines 10, 7a. In a normal case, however, fuel spillage into the vent lines 7a or 10 is prevented by the closure of the flow-control valve 18 essentially immediately after the maximum fullness level 60 has been attained. If the nozzle 21 continues to pump fuel, this fuel enters the environment by way of the opened sealing diaphragm 32.

The aforementioned check valve 13 can also be configured as a 3/3-way valve.

LIST OF REFERENCE CHARACTERS

| | | | |
|---|---|---|---|
| 1 | Tank system | 34 | Nozzle hose |
| 2 | Tank | 35 | Sleeve |
| 3 | Filling tube | 35a | Sleeve |
| 4 | Filling conduit | 36 | Housing |
| 5 | Fuel | 37 | Central longitudinal axis |
| 6 | Adsorption filter | 38 | Cable |
| 7 | First vent line | 39 | Cable loop |
| 8 | Gas area | 40 | End |
| 9 | Vent gas | 41 | End |
| 10 | Second vent line | 42 | Tube |
| 11 | Termination site | 43 | Arrow |
| 12 | First check valve | 44 | Narrowing |
| 13 | Second check valve | 45 | Radial recess |
| 14 | Discharge line | 46 | End face |
| 15 | Line | 47 | End face |
| 16 | Check valve | 48 | Drive part |
| 16a | Scavenging valve | 49 | Arrow |
| 17 | Suction line | 50 | Inside wall |
| 18 | Flow-control valve | 51 | Fullness-level sensor |
| 19 | Closing element | 52 | Pressure sensor |
| 20 | Filling device | 53 | Flow sensor |
| 21 | Gas nozzle | 54 | Load sensor |
| 22 | Edge | 55 | Nozzle sensor |
| 23 | Valve seat | 56 | Control module |
| 24 | Actuating pin | 57 | Diagnosis module |
| 25 | Drive lever | 58 | Location |
| 26 | Electromagnet | 59 | First fullness level |
| 27 | Two-headed arrow | 60 | Second fullness level |
| 28 | Compression spring | S1–S5 | Signal lines |
| 29 | Base surface | C1–C6 | Control lines |
| 30 | Support strut | D | Data line |
| 31 | Filling opening | p | Internal tank pressure |
| 32 | Sealing diaphragm | | |
| 32a | Sealing diaphragm | | |
| 33 | Diaphragm Opening | | |

What is claimed is:

1. A method of filling a fuel tank (2) having a first and second vent line (7, 10) and a filling conduit (4), having a tank-side flow opening, in which a sensor (53) detects the fuel flow entering the tank and generates a signal which assists in monitoring and controlling the fueling process comprising introducing fuel through the filing conduit (4).

2. The method according to claim 1, in which the gas area (8) of the tank (2) is connected to an adsorption filter (6) by way of an additional vent line (7) in the presence of a fuel flow.

3. The method according to claim 2, in which, when a first fuel level (59) is attained, the flow opening of the tank-side end of the filling conduit (4) is at least briefly closed, provided that a fuel flow is present in the filling conduit.

4. The method according to claim 1, in which, when a first fuel level (59) is attained, the flow opening of the tank-side end of the filling conduit (4) is throttled if a fuel flow is present in the filling conduit.

5. The method according to claim 3, in which, when a second fullness level (60) is attained, at least the connection produced by additional vent conduit (7a) between the tank (2) and the Adsorption filter (6) is broken, and the flow opening of the filling conduit (4) is closed.

6. The method according to claim 5, in which a further connection between the tank (2) and the adsorption filter (6), which assures operational ventilation, is broken, and a connection is produced between the tank (2) and the atmosphere.

7. The method according to claim 1, in which an annular gap that is present between the nozzle hose (34) of a gas nozzle (21), the hose being inserted into the filling-side end of the filling conduit (4), and the wall of the filling conduit (4) is sealed against the atmosphere during the fueling phase until a first fullness level (59) is attained, but is opened when a second fullness level (60) is attained.

8. The method according to claim 7, in which the annular gap is sealed as soon as a fuel flow is present in the filling conduit (4).

9. The method according to claim 7, in which the annular gap is sealed as soon as a sensor (55) detects the inserted nozzle hose (34) of a gas nozzle (21).

10. A fuel-tank system, for executing the method according to claim 1, comprising,
   a fuel tank (2),
   a filling tube (3), that terminates in the fuel tank (2),
   an adsorption filter (6) that is connected to gas area (8) of the tank (2), and
   a flow sensor (53), which detects a fuel flow in the filing tube (3) and produces a signal.

11. The tank system according to claim 10, characterized in that the flow sensor (53) is a capacitive sensor.

12. The tank system according to claim 10, characterized in that a fullness-level sensor (51) is disposed in the tank (2), and a flow-control valve (18) that is controlled as a function of the fullness level is disposed in the region of the tank-side end of the filling tube (3) for throttling or cutting off the fuel flow overflowing from the filling tube (3) into the fuel tank (2).

13. The tank system according to claim 12, characterized in that a fullness-level sensor (51) is disposed in the fuel tank (2).

14. The tank system according to claim 10, characterized in that a sealing diaphragm (32) having a diaphragm opening (33) that closes with the aid of a drive disposed in the region of the filling tube (3) that receives the nozzle hose (34) of a nozzle (21).

15. The tank system according to claim 14, characterized in that the sealing diaphragm (32) is essentially formed by a sleeve (35) that is elastically deformable in at least the radial direction.

16. The tank system according to claim 15, characterized in that the periphery of the sleeve (35) is surrounded by a cable loop (39) that can be tightened by a motor.

17. The tank system according to claim 15, characterized in that the sleeve (35a) is positioned in a radial recess (45) of the filling tube (3) in a form-fit, which axial extension of the radial recess being altered by a motor.

18. The tank system according to claim 10, characterized by a first vent line (7), which connects the adsorption filter (6) to the tank (2) and has a larger flow cross section, with a first check valve (12) being switched into this line.

19. The tank system according to claim 18, characterized by a second vent line (10), which has a smaller flow cross section and terminates into the first vent line (7), between the adsorption filter (6) and the first check valve (12), with a second check valve (13) being disposed in the first vent line (7), after the termination site (11) in the ventilation direction.

20. The tank system according to claim 19, characterized in that the second check valve (13) is embodied as a 3/2-way valve.

21. The tank system according to one of claim 10, characterized by a pressure sensor (52) that detects the internal tank pressure (8).

22. The tank system according to claim 10, characterized by a nozzle sensor (55), which detects a nozzle (21) that has been inserted into the filling tube (3).

23. The tank system according to claim 10, characterized in that all of the sensors are connected to a control module (56) by way of signal lines (S1–S5).

24. The tank system according to claim 23, characterized in that the flow-control valve (18) and the first and second check valves (12, 13) are electromagnetically actuated, and are actuated by the control module (56) by way of control lines (C1, C6, C5).

* * * * *